Patented May 21, 1935

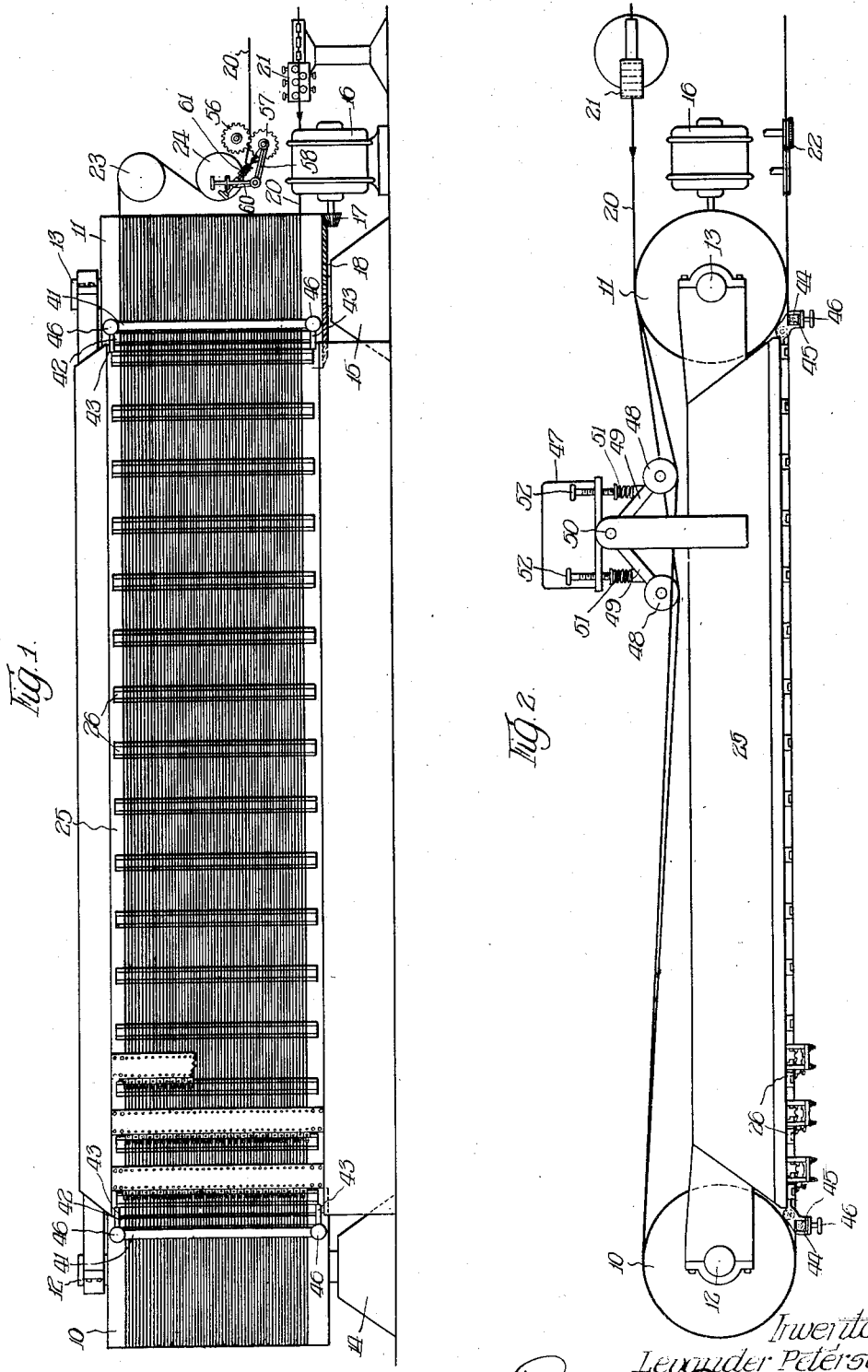

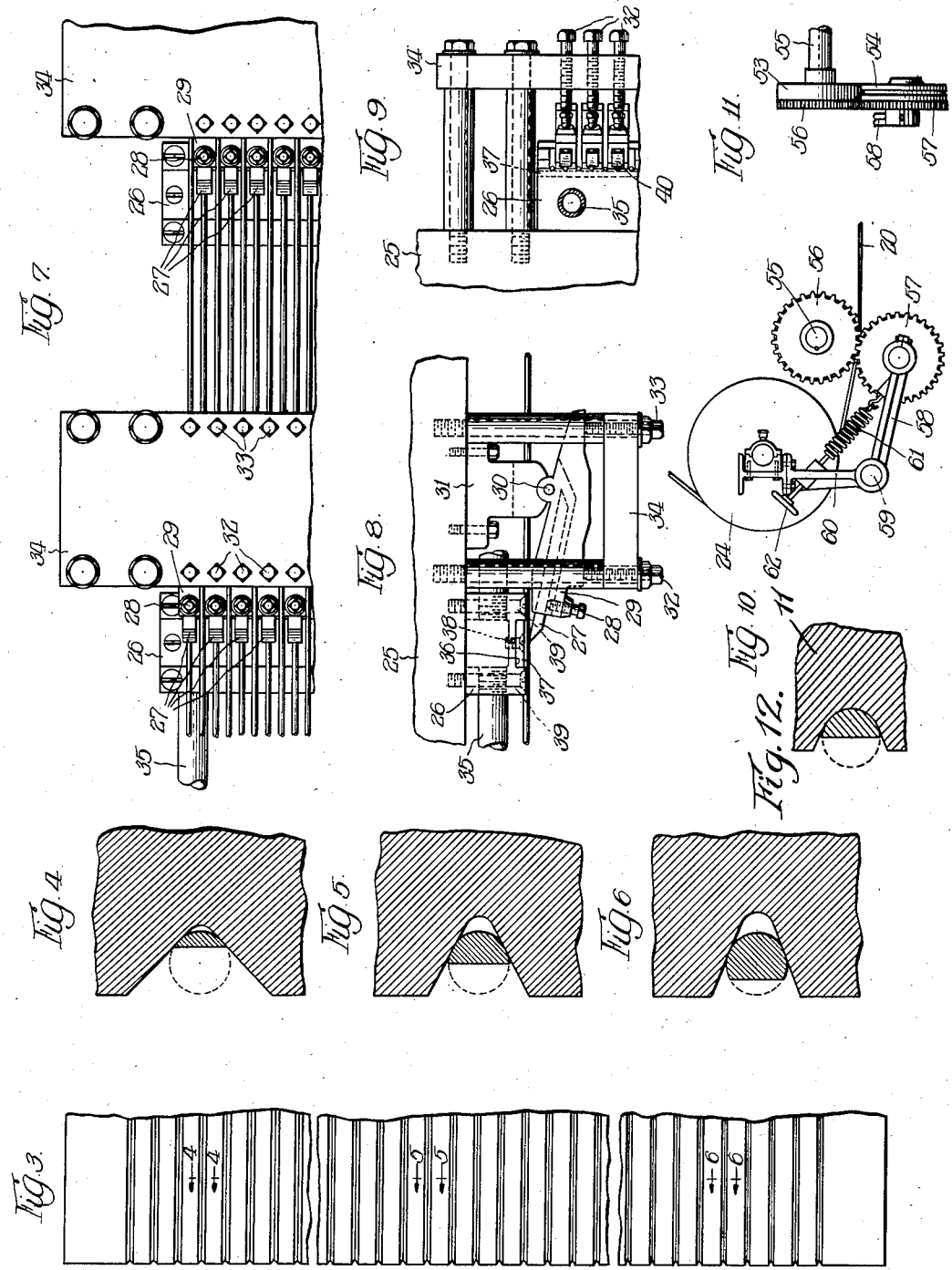

2,001,940

UNITED STATES PATENT OFFICE 2,001,940

MACHINE FOR MAKING METAL WOOL

Levander Peterson, Chicago, Ill., assignor to James H. Rhodes & Company, Chicago, Ill., a corporation of Illinois Application January 7, 1929, Serial No. 330,892

7 Claims. (Cl. 29—4.5)

This invention has to do with steel wool machines of the type in which the wool is produced by being cut in fine shavings from wire.

The purpose of the invention is to provide a steel wool machine of novel construction, arrangement and operation, which acts upon a large quantity of wire at one time, is capable of a high rate of production, and requires the attention of but a relatively few operators.

Other more specific objects and advantages of the invention will be apparent to those skilled in the art upon a full understanding of the construction, arrangement and operation of the machine.

One form of the invention is presented herein for the purpose of exemplification, but it will of course be appreciated that the invention is susceptible of embodiment in other structurally modified forms coming equally within the scope of the appended claims.

In the accompanying drawings:

Fig. 1 is a front view of a machine constructed in acordance with the invention;

Fig. 2 is a top view of the machine;

Fig. 3 is a side view of a portion of one of the drums, showing in detail the circumferentially extending grooves for the reception of the wire;

Fig. 4 is a radial section through the driving drum taken on the line 4—4 of Fig. 3;

Fig. 5 is a similar section, taken on the line 5—5 of Fig. 3;

Fig. 6 is a similar section, taken on the line 6—6 of Fig. 3;

Fig. 7 is a front view of a portion of the cutting bed, showing in detail the knives and the blocks against which the strands of wire bear while being cut by the knives;

Fig. 8 is a top view of that portion of the machine shown in Fig. 7;

Fig. 9 is an end view of the same;

Fig. 10 is a front view of the device which takes off the wire from the machine after all of the savings have been cut from the same;

Fig. 11 is an end view of such device; and

Fig. 12 is a fragmentary radial section through the idling drum, corresponding generally to Figs. 4, 5, and 6.

The machine shown in the drawings includes two vertically extending cylindrical drums 10 and 11 which are journaled on upright shafts 12 and 13 mounted on pedestals 14 and 15. The drum 11 is dirven by an electric motor 16 through a beveled pinion 17 on the armature shaft of the motor which meshes with a beveled gear 18 on the bottom of the drum. Both drums are provided with a large number of closely arranged circumferentially extending grooves 19 (see Fig. 3), and the wire 20 from which the wool is cut is trained about the drums in the grooves in horizontal elongated loops. The wire is fed to the lowermost grooves in the drums through a straightening device 21 which places a certain amount of drag on the wire, travels upwardly about the drums in substantially horizontal stretches which extend from the grooves in one drum to the grooves in the other, and is taken from the uppermost grooves in the drums by a tensioning device 22, to which device the wire is directed by intervening idler pulleys 23 and 24.

A vertically extending cutting bed 25 is positioned between the drums behind the horizontal strands of wire approaching the driven drum 11, and is faced with a row of vertically extending blocks 26 across which the wire travels during the cutting operation. Each of the blocks 26 has in association therewith a vertically extending tier of closely arranged knives 27 (see Figs. 7, 8 and 9), which knives are secured by set screws 28 in holders 29. The holders are separately pivoted at 30 to brackets 31 secured to the bed 25, and are adjustably positioned by means of set screws 32 and 33 which pass through a vertically extending bar 34 into engagement with the opposite ends of the holders. In order to advance any one of the knives toward the strand of wire opposite the same, the screw 33 associated with that knife is turned out and the screw 32 is turned in, the extent to which both screws are turned being determined of course by the amount of adjustment desired.

The knives in any one tier engage only with alternate strands of the wire, while the knives in any adjoining tier engage only with the intervening strands, with the result that a large number of closely arranged strands can be operated on without interference. Inasmuch as experience has shown that if more than eight knives are applied against a strand breakage is likely to occur, the machine of the present invention is preferably provided with sixteen tiers of knives, with knives in alternate tiers engaging each strand.

The blocks 26 are hollow, and are connected in series by pipes 35. The pipe leading to the first block is connected with a source of water under pressure, or other cooling medium, and the pipe leading from the last block is connected with a drain, with the result that the blocks are prevented from becoming overheated by the cutting action taking place against the same. Each of the blocks is provided intermediate its front edges with a recess 36 into which a narrow strip 37 is set. The strip 37 is detachably secured to the block by means of screws 38, and the front face of the strip is arranged slightly to the rear of the front edges 39 of the block at opposite sides thereof. The front edges of the block are provided with aligned grooves 40 in which the strands of wire are guided across the strip 37, and the bottoms of such grooves are arranged flush with the front face of the strip so that the strands are backed up by the strip at the point where they are engaged and cut into by the knives. The wear occasioned by the pressure and friction of the moving strands of wire is taken up entirely by the strip, rather than by the grooved side edges of the block, and, when the wear has progressed to such a stage as to hollow out the strip behind the strands of wire, the position of the strip may be changed slightly in a direction longitudinally of the block or a new strip may be substituted for the worn one.

At each end of the machine is located a pair of vertically extending cylindrical tensioning rolls 41 and 42. The ends of the rolls are supported in brackets 43 secured to the upper and lower portions of the bed 25. The roll 41 is located in front of the wire strands, while the roll 42 is positioned close to the roll 41 behind the strands of wire. The ends of the roll 41 are journaled in blocks 44 which are slidably mounted in guides 45 in the brackets 43, and the blocks 44 are movable to shift the roll 41 toward or away from the wire strands by hand screws 46. The roll 42 is tangential to the plane of the bottoms of the grooves 40 in the front edges 39 of the blocks 26, and the wire strands bear against such roll. When it is desired to increase the tension of the strands, the roll 41, which is in contact with the front surfaces of the strands, is moved rearwardly by the hand screws 46 until the bends in the strands caused by the roll 41 have absorbed any slack present and imparted to the strands the desired tension.

At the back of the machine is positioned a device 47 which serves to render the tension on all of the wire strands uniform. The device consists of two vertical tiers of forwardly spring-pressed trolley wheels 48. The wheels are mounted on arms 49 which are pivoted at 50 to a suitable frame, and the wheels in one tier engage with alternate wire strands while the wheels in the other tier are interleaved therewith and engage with the remaining strands of wire. The wheels are pressed against the strands by separate coil springs 51, and the pressure exerted by the springs is adjusted by means of separate hand screws 52.

The tensioning device 22, which serves to draw the wire 20 away from the machine after the shavings have been cut therefrom, consists of two rollers 53 and 54. The roller 53 is secured to, and positively driven by, a shaft 55, and has rigidly associated therewith a gear 56 which meshes with a gear 57 secured to the roller 54. The wire, upon leaving the grooved drums 10 and 11, passes about the idler pulleys 23 and 24 and between the peripheries of the rollers 53 and 54, one of which rollers is provided with a circumferentially extending groove for guiding the wire. The roller 54 is journaled in the free end of an arm 58 which is pivoted at 59 to a bracket 60, in which bracket the pulley 24 is journaled, and a spring 61 which extends between the free end of the arm 58 and a part of the bracket 60 removed from the pivot 59 serves to draw the roller 54 toward the roller 53 whereby to frictionally engage the wire therebetween. The linear speed at which the roller 53 is driven is preferably a little greater than that at which the drum 11 is rotated, with the result that the rollers 53 and 54 draw the wire 20 from the machine under tension, the amount of slippage of the wire between the rollers 53 and 54 being determined by the tension of the spring 61 as regulated by a readily accessible hand screw 62 associated with the spring.

The grooves in the driven drum 11 are preferably of V-shaped cross section (see Figs. 3, 4, 5 and 6), and increase progressively in acuteness from the upper end of the drum to the lower ends of the same. The particular shaping of the grooves as herein illustrated and described possesses several advantages. The converging side walls of the groove act on the strands to prevent the same from turning; the more acute grooves adjacent the lower portions of the drum provide greater traction than the less acute ones, and are located where the most traction is needed; and the less acute grooves near the upper end of the drum tend to prevent the thin wire from turning sidewise and yet afford ample traction. The grooves in the idler drum 10 are preferably rounded, so as to permit slippage of the wire strands with respect to the same.

The operation of the machine is as follows:

The wire 20 from which the wool is to be shaved is fed through a straightening and retarding device 21 to the lowermost grooves in the drums 10 and 11, and winds back and forth from one drum to the other in elongated loops until it reaches the uppermost grooves in the drums, where it is drawn off under tension between the rollers 53 and 54. The wire, when thus trained about the drums 10 and 11, presents a large number of parallel horizontally extending strands upon which the knives operate, with the knives in adjoining tiers operating upon different strands. The tension on the strands may be increased or decreased by adjustment of one or both of the movable rolls 41, or by adjustment of the spring tension on the roller 54, while the tension on all of the strands is maintained uniform by the action of the forwardly spring-pressed trolley wheels 48 upon the strands. The strands are drawn past the knives by the traction provided by the grooving in the driven drum 11, and the blocks 26 against which the strands bear during the cutting operations are maintained at an efficient operating temperature by the circulation of water or other cooling medium through the same.

I claim:

1. A machine for making metal wool from wire, comprising two grooved drums about which the wire is trained in elongated loops, means for driving one of the drums, and means for shaving the wool from the wire as the wire travels from one drum to the other, the grooves in the driven drum being V-shaped in radial cross-section and becoming progressively less acute from the end of the drum onto which the uncut wire is fed to that from which the cut wire is taken.

2. A machine for making metal wool from wire, comprising a block having grooves therein, means for drawing a number of strands of wire across the block in the grooves, means in opposition to the block for cutting shavings from the strands, and a plate detachably secured to the block flush with the bottoms of the grooves for backing the wire at the point of engagement of said cutting means.

3. A machine for making metal wool from wire, comprising a block having aligned grooves in the opposite edges thereof, means for drawing a number of parallel strands of wire across the block in the grooves, means in opposition to the center portion of the block for cutting shavings from the strands, and a plate detachably secured to the center portion of the block flush with the bottoms of the grooves for backing the wire at the point of engagement of said cutting means.

4. A machine for making metal wool from wire, including two vertical drums about which the wire is trained in elongated horizontal loops, means for driving one of the drums, a vertical cutting bed positioned between the drums behind the strands of wire approaching the driven drum, means in opposition to the bed for cutting shavings from such strands, and means for rendering the tension on all of the strands uniform comprising individual idler rollers in separate spring-pressed engagement with the strands leaving the driven drum.

5. A machine for making metal wool from wire, comprising one grooved driven drum and one grooved idling drum about both of which the wire is trained in elongated loops, and means for cutting shavings from the strands of wire approaching the driven drum, the grooves in the driven drum being V-shaped in radial cross-section to afford traction for the strands, and the grooves in the idling drum being rounded in radial cross-section to allow slippage of the strands.

6. A machine for making metal wool from wire, comprising a bed, blocks fastened to the bed, means for drawing a number of parallel strands of wire across the blocks, cutters for engagement with the strands in opposition to the blocks, brackets fastened to the bed, pivotal connections between the brackets and the cutters, other members fastened to the bed, and adjustable screw connections between such members and the cutters.

7. A machine for making metal wool from wire, including a pair of parallel drums about which a wire is wound in a number of elongated loops, means for rotating one of the drums, a bed between the drums across which the strands of wire approaching the driven drum travel, means in opposition to the bed for cutting shavings from such strands, means for increasing or decreasing the tension on all of the strands, and additional means for equalizing the tension on the strands.

LEVANDER PETERSON.